(12) United States Patent
Osborn et al.

(10) Patent No.: US 7,416,079 B2
(45) Date of Patent: Aug. 26, 2008

(54) INJECTION MOLDED CASE FOR OPTICAL STORAGE DISCS

(75) Inventors: Warren R. Osborn, Provo, UT (US); Bryan P. Dunford, Pleasant Grove, UT (US)

(73) Assignee: Encore Holdings Limited, Nassau (BS)

( * ) Notice: Subject to any disclaimer, the term of this patent is extended or adjusted under 35 U.S.C. 154(b) by 0 days.

(21) Appl. No.: 11/432,831

(22) Filed: May 11, 2006

(65) Prior Publication Data

US 2007/0102310 A1 May 10, 2007

Related U.S. Application Data

(63) Continuation-in-part of application No. 11/268,205, filed on Nov. 7, 2005.

(60) Provisional application No. 60/795,504, filed on Apr. 27, 2006.

(51) Int. Cl.
 *B65D 85/57* (2006.01)

(52) U.S. Cl. .................................. 206/308.1; 206/232

(58) Field of Classification Search ................ 206/307, 206/308.1, 308.3, 309–312, 493, 387.1, 387.13, 206/232

See application file for complete search history.

(56) References Cited

U.S. PATENT DOCUMENTS

| 6,164,446 | A | * | 12/2000 | Law | 206/308.1 |
| 2003/0029761 | A1 | * | 2/2003 | Onmori et al. | 206/387.13 |
| 2003/0146119 | A1 | * | 8/2003 | Lee | 206/310 |
| 2003/0196916 | A1 | * | 10/2003 | Jakobowicz | 206/308.1 |
| 2006/0191809 | A1 | * | 8/2006 | Heuser et al. | 206/308.1 |

* cited by examiner

*Primary Examiner*—Luan K Bui
(74) *Attorney, Agent, or Firm*—Robert D. Katz, Esq.; Cooper & Dunham LLP

(57) ABSTRACT

An injection molded DVD case includes a spine, a front cover coupled to the spine via a first living hinge, and a back cover coupled to the spine via a second living hinge. The case, when in a closed configuration, has generally semi-cylindrical rimwalls, including upper and lower rimwalls, a spine rimwall, and a closure rimwall, which intersect in generally quarter-spherical corners. The generally semi-cylindrical rimwalls have been flattened slightly to prevent multiple closed cases that are being pushed down an assembly line from climbing over one another. The new DVD case has an off-center disk mounting hub so that the disk cannot be seen through a transparent title band at the top of the case and also to leave room for the attachment of an EAS tag inside the case. The case also incorporates significant anti-theft features.

8 Claims, 12 Drawing Sheets

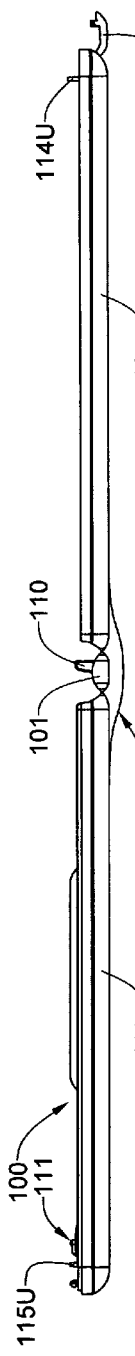
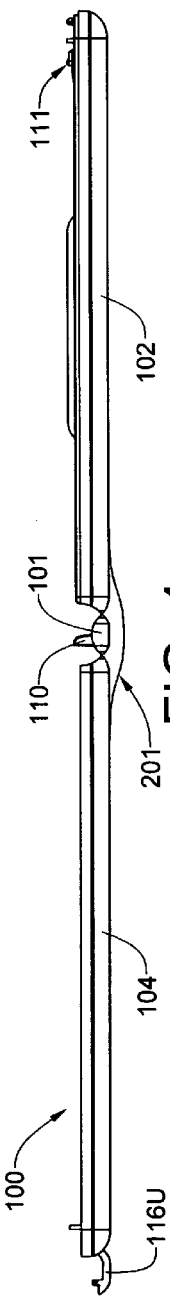
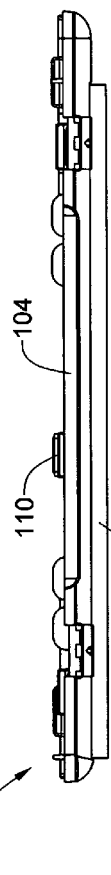
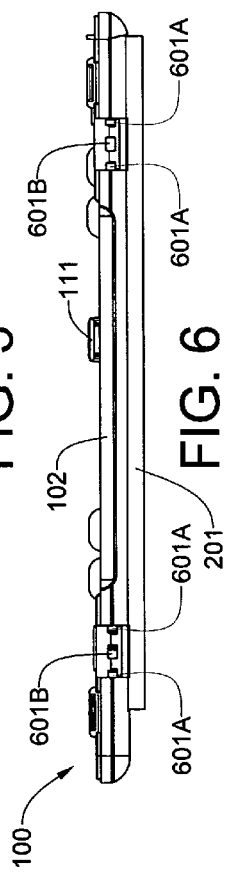
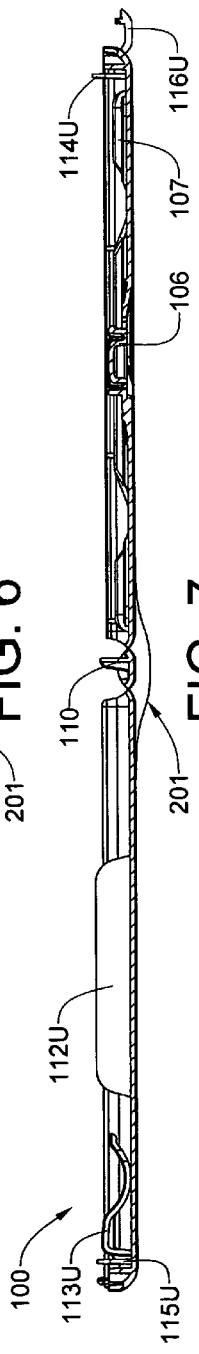

INJECTION MOLDED CASE FOR OPTICAL STORAGE DISCS

CROSS REFERENCE TO RELATED APPLICATIONS

This is continuation-in-part of U.S. patent application Ser. No. 11/268,205, which was filed on Nov. 07, 2005. Applicants claim priority of U.S. Provisional Patent Application Ser. No. 60/795,504 filed on Apr. 27, 2006.

BACKGROUND OF THE INVENTION

1. Field of the Invention

This invention relates to cases for optical storage discs such as compact discs and digital video discs and, more particularly, to injection molded cases having a wrap-around flexible sleeve.

2. Description of the Prior Art

Cases for storing optical storage discs, such as compact discs (CDs) and digital video discs (DVDs) CDs and digital video discs (DVDs), when not being used, have been manufactured for about twenty years. The typical case is a square-cornered box having a center hub for receiving the central mounting aperture of the disk. There are significant differences between so-called "jewel cases" used to store CDs and the taller cases used to store DVDs. The first significant difference is that conventional jewel cases are typically injection molded from polystyrene plastic. As the use of this material precludes the use of a "live" hinge, the cases covers are formed in two pieces—a front cover and a back cover—that use snap-together hinges. A third piece, which is internal to the case, snaps into the back cover and holds the back information sheet in place. The second significant difference is that the mechanism used to hold CDs is generally a spring plastic assembly that requires that CDs be pried therefrom. DVD cases, on the other hand, are typically injection molded as a single piece from polyolefins, such as polyethylene and polypropylene, and rely on live hinges to interconnect a front cover, a spine and a back cover. In addition, as DVDs are considered to be more fragile than CDs, DVD case specifications require a disc retaining mechanism (usually called a hub) having a push-button release. Although some CD cases have been injection molded from polyolefins such as polyethylene and polypropylene and have used disc attachment mechanisms that do not require the CD to be pried therefrom, they constituted a tiny minority of CD cases in use.

U.S. Pat. No. D459,935 discloses a typical injection-molded DVD case. It has a spine connected to both a front cover and a back cover via live hinges. Live hinges are ultrathin and, hence, ultra-flexible strips of polyolefin material formed between spine and covers during the injection molding process. The case of this patent, like nearly all of those produced by the DVD packaging industry, is a shallow, medially split rectangular box with filleted edges and corners.

A serious problem associated with the designs of current DVD cases is that the video disc stored within the case can be stolen without fully opening the case. Although most DVD cases have a disposable RF security label adhesively attached to the inside of the case, clever shoplifters have learned how to pop the disc from the hub by squeezing the case, pry the case open along a single edge, and then shake the disc out of the case. The shoplifter walks out of the store with the disc, leaving the case and the security label behind. It is estimated that, in certain retail markets, up to a tenth of DVDs placed on sale are stolen from their cases.

Recently, high-definition DVDs which are read by laser diodes operating in the blue range of the electromagnetic spectrum have been introduced. Such DVDs are capable of storing far more data because blue lasers have a shorter wavelength than previously used lasers and, hence, greater resolution. Marketing experts in the DVD distribution industry want to provide packaging that is uniquely identifies the "Blue-Ray" DVDs.

What is needed is a new injection molded DVD case that has a new, more modern and aesthetically appealing appearance, that can be used with existing equipment at DVD reproduction and packaging companies, and that includes additional security features that hamper removal of a packaged DVD from its case before it can be sold.

SUMMARY OF THE INVENTION

The present invention provides a new DVD case that answers the heretofore expressed need for a new one-piece, injection molded DVD case that has a new, more modern and aesthetically appealing appearance, that can be used with existing packaging equipment at DVD reproduction facilities, and that includes additional security features that hamper removal of a packaged DVD from its case before it is sold. As with conventional DVD cases, it also includes a spine, a front cover coupled to the spine via a first living hinge, and a back cover coupled to the spine via a second living hinge. However, for a preferred embodiment of the invention, the new DVD case, when in a closed configuration, has generally semi-cylindrical rimwalls, including upper and lower rimwalls, a spine rimwall, and a closure rimwall, which intersect in generally quarter-spherical corners. So that the front cover, the back cover and the spine may lie in a common plane when in an open configuration, it was found necessary to position the first live hinge at a first quarter position along the spine rimwall, and the second live hinge at a third quarter position along the spine rimwall. In other words, the front cover incorporates about one-fourth of the spine rimwall, the spine incorporates about one-half of the spine rimwall, and the back cover incorporates the remaining about one-fourth of the spine rimwall. This configuration has an added advantage in that, when the case is open, it occupies less table space than does a DVD case having the same thickness and a flat spine that is perpendicular to the front and back covers when the case is closed. For the DVD case of parent application Ser. No. 11/268205, the Mylar® sleeve which surrounds and covers major portions of the spine and front and rear covers and in which is inserted a printed paper title and credits page, was set back approximately 2.2 centimeters from both the top and bottom of the case. This feature is clearly evident in drawing FIGS. 1, 5, 6, 8, 9, 11, 12, 13 and 17. On samples that were sent to potential customers, the title "HD DVD" was imprinted in the band above the sleeve on the front cover. The present invention differs from that of the parent application in several ways. Firstly, the feet at the bottom of the case have been eliminated. Secondly, the case is shorter and thinner. Thirdly, commensurate with the shortening of the case, the setback of the sleeve from the bottom of the case has been reduced so that it begins adjacent the generally semi-cylindrical bottom rimwall. Fourthly, the generally semi-cylindrical rimwalls have been flattened slightly to prevent multiple closed cases that are being pushed down an assembly line from climbing over one another. Fifthly, the DVD case of the present application features a disk mounting hub that is offset below the center of the case for two reasons. As a preferred embodiment of the case is made of generally transparent polypropylene, the setback of the Mylar® sleeve from the top of the case exposes a band on which an identifying logo such as "HD DVD" or "Blue Ray DVD" can be printed, imprinted or embossed, it is important for aesthetic reasons that visibility through the band, from one side of the case to the other, be unobstructed by objects stored within the case. Therefore, by offsetting the DVD mounting hub and platform toward the bottom of the case, visibility through the band can remain unobstructed. In addition, the downward offset of the mounting hub and platform also provides space inside the case above the disk mounting platform and below the band for installation of an Electronic Article Surveillance (EAS) tag. Another unique feature of the new case is that the height of the disk mounting platform has been reduced so that it does not interfere with the automated equipment that attaches the EAS tag to an inside surface of the case. Not only is the new DVD case unique and more aesthetically pleasing than current designs, it is also features enhanced structural rigidity and requires slightly less polyolefin material for its manufacture.

The new DVD case also incorporates significant anti-theft features. The spine incorporates a tab that rotates down over the outer edge of the DVD when the cover is in a closed configuration. Likewise, the front cover has a bracket of L-shaped cross section that locks over the opposite outer edge of the DVD when the front cover is closed. Inner guide walls on the inside front cover have two functions: firstly, to guide the placement of the booklet that will be installed within the case so that it does not encroach on the band at the top of the case and, secondly, to make it more difficult to shake a DVD, that has been released from its mounting hub, out of the top or bottom ends of the case that have been partially opened by bowing the front and back covers of the case. The guide walls make it necessary to bow the case considerably more than would be necessary for a case without such guide walls. The case also incorporates a pair of projections which extend vertically from the rear cover vertical near the closure edge. These projections make it difficult to slide a DVD out of the closure side of the case when it is opened just a crack. As an additional security feature, the case can be equipped with at least one, and preferably two security latches that lock the front and back covers together along their closure edges, and can be taped over to slow down shoplifters, thereby making it more difficult to open the case, especially when wrapped in a heat-sealed sheet of transparent display wrap. The latches do not detract from the aesthetic quality of the case, as they conform to the shape of the case when closed and locked.

BRIEF DESCRIPTION OF THE DRAWINGS

FIG. 3 is an elevational view of the bottom of the new injection-molded DVD case in a full-open configuration;

FIG. 4 is an elevational view of the top of the new injection-molded DVD case in a full-open configuration;

FIG. 5 is an elevational view of the closure edge of the back cover of the new injection-molded DVD case in a full-open configuration;

FIG. 6 is an elevational view of the closure edge of the front cover of the new injection-molded DVD case in a full-open configuration;

FIG. 7 is a cross-sectional view of the new injection-molded DVD case in full-open configuration, taken through section line 10-10 of FIG. 1;

DETAILED DESCRIPTION OF THE INVENTION

Figure 1:
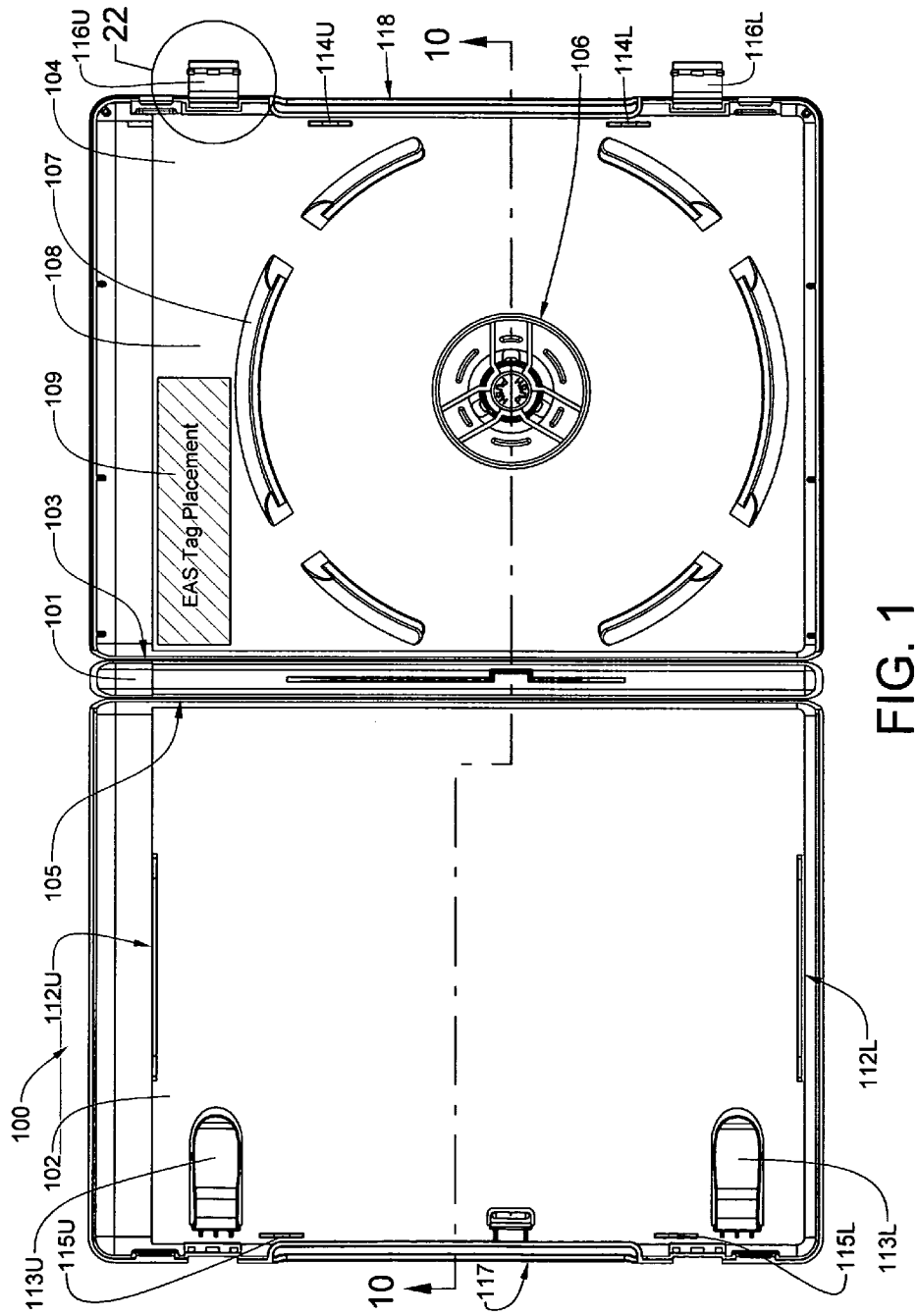
FIG. 1 is a plan view of the inner major surfaces of the new injection-molded DVD case in a full open configuration.

The new injection molded DVD case will now be described with reference to the attached drawing figures. Item numbers will be assigned such that the most significant digit if the item number is a 3-digit number or the two most significant digits if the item number is a 4-digit number, is or are the same as the drawing number in which that item is first identified.

Referring now to the open DVD case of FIG. 1, a new injection-molded DVD case 100 has a more modern, aesthetically appealing appearance, and can be used with existing packaging equipment at DVD reproduction facilities. As with conventional DVD cases, the new DVD case 100 includes a spine 101, a front cover 102 coupled to the spine 101 via a first live, or living, hinge 103, and a back cover 104 coupled to the spine 101 via a second live hinge 105.

Figure 2:
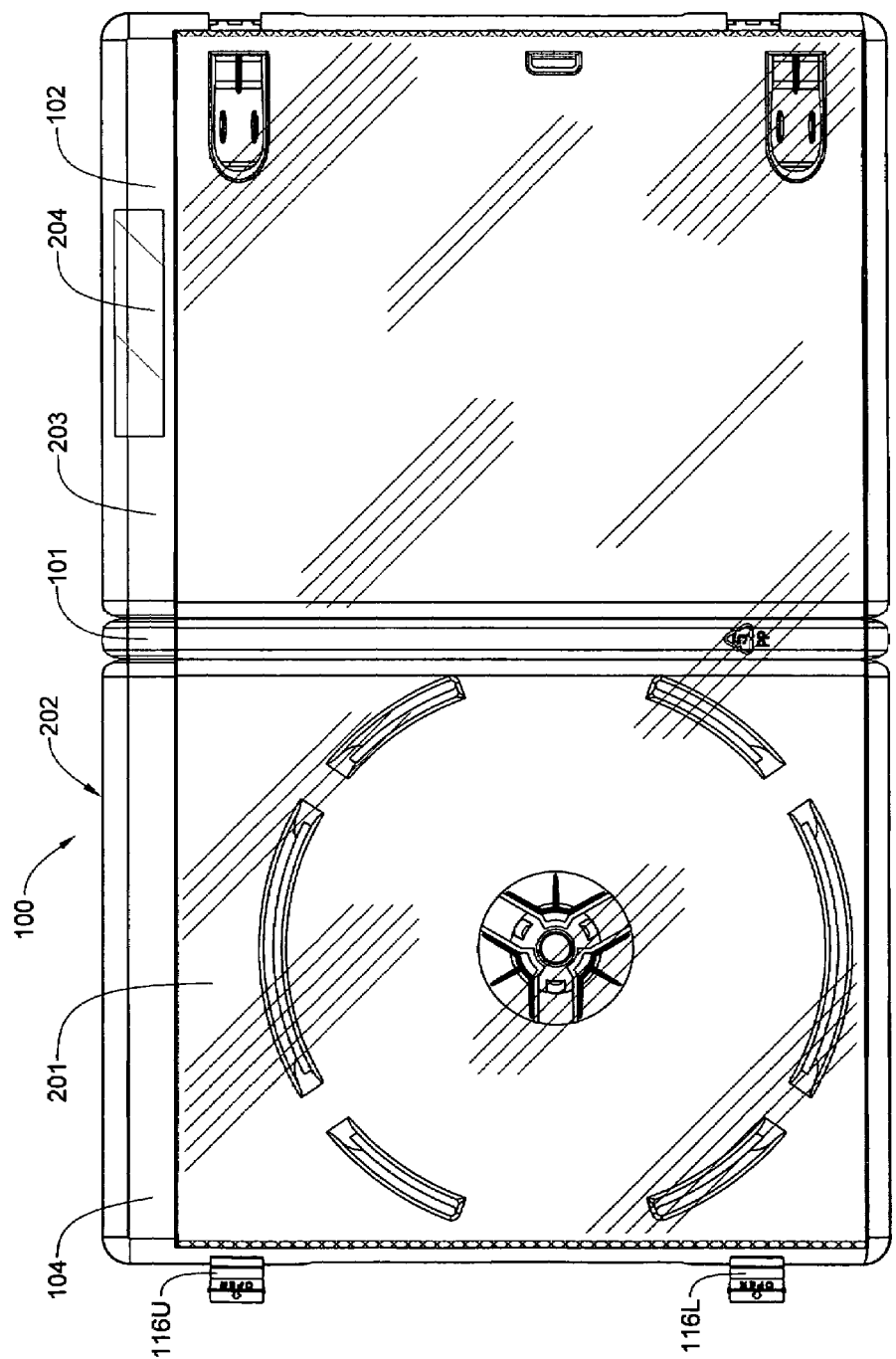
FIG. 2 is a plan view of the outer major surfaces of the new injection-molded DVD case in a full-open configuration.
Figure 8:
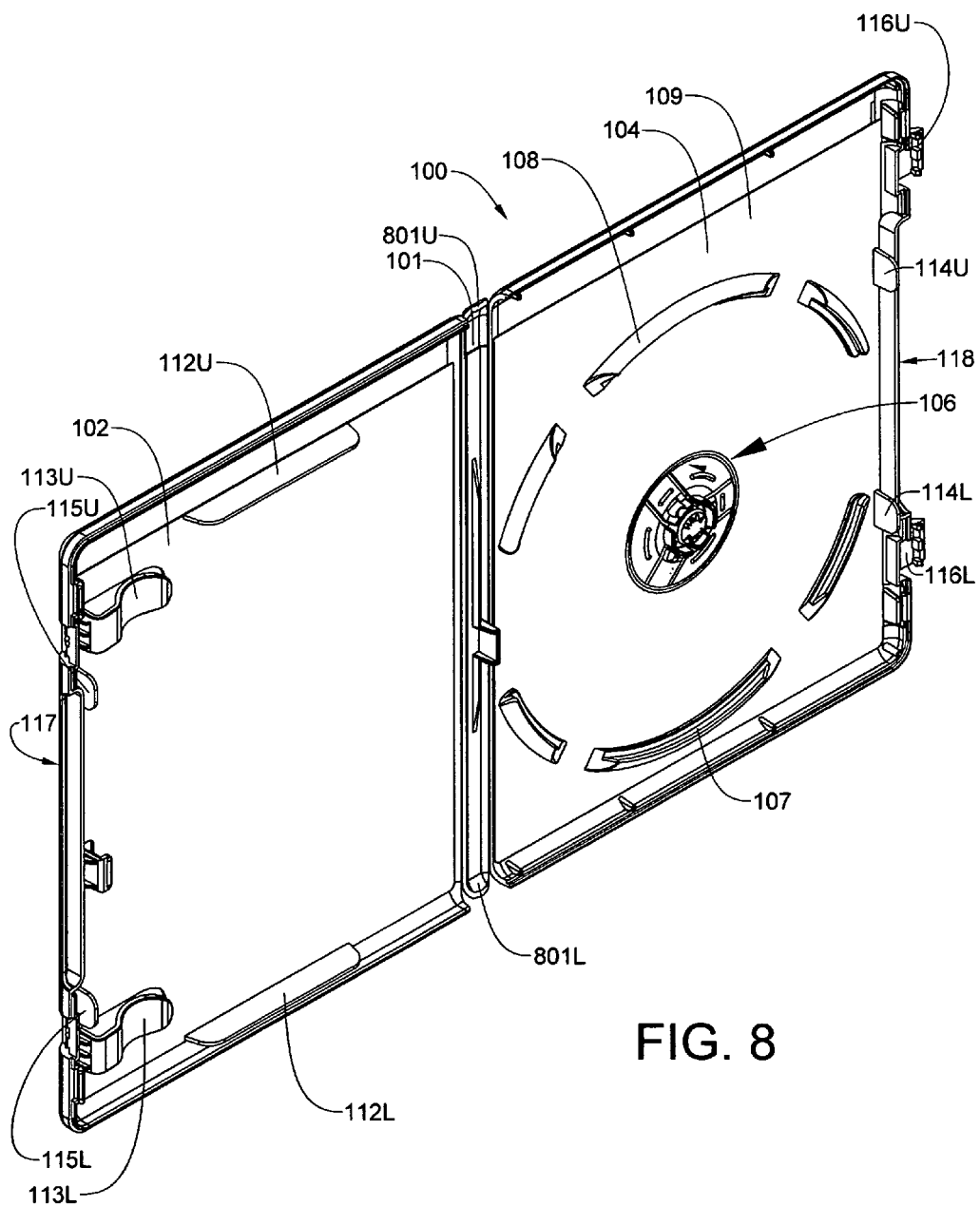
FIG. 8 is an isometric view of the new new injection-molded DVD case in full-open configuration, taken from an upper left vantage point and showing, primarily, the inner surfaces, the top edge, and the closure edge of the front cover.
Figure 9:
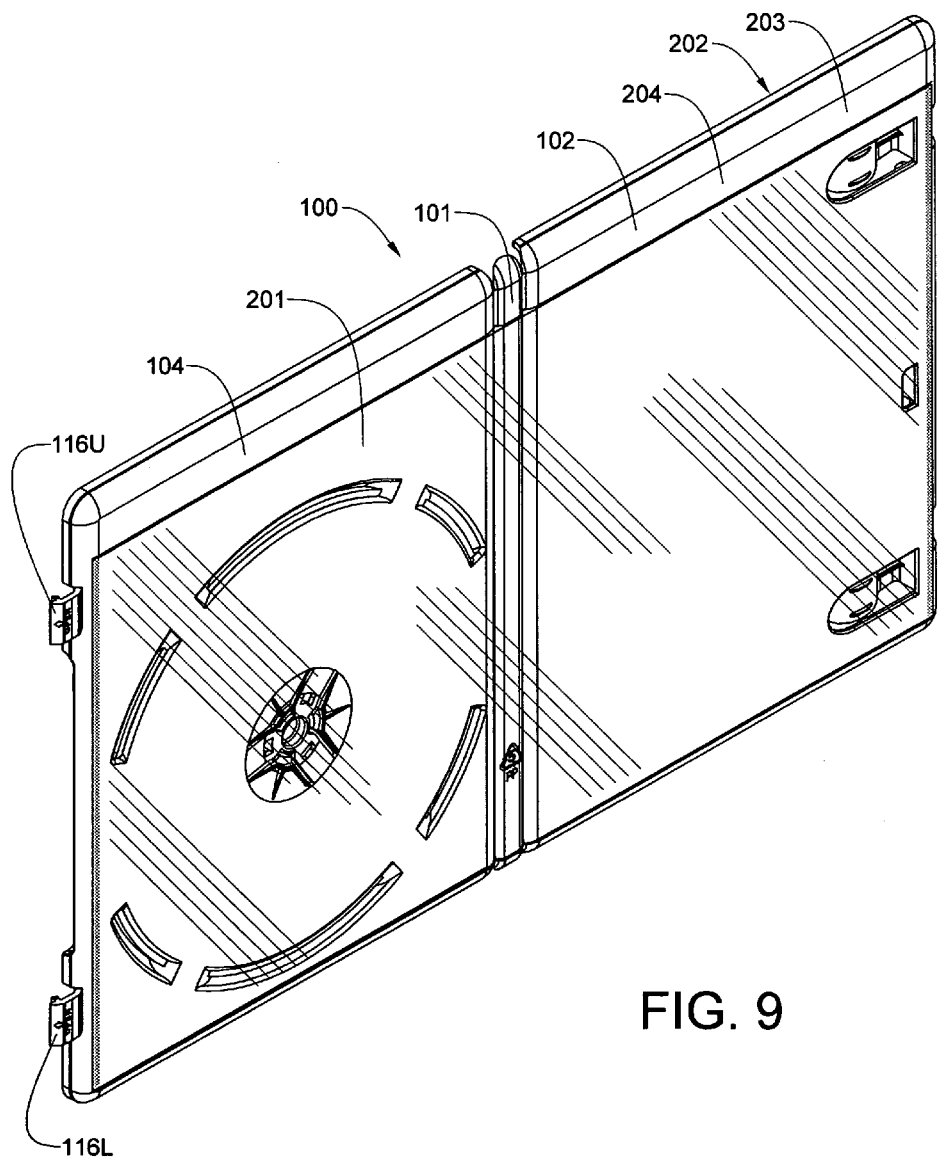
FIG. 9 is an isometric view of the new new injection-molded DVD case in full-open configuration, taken from an upper left vantage point and showing, primarily, the outer surfaces, the top edge, and the closure edge of the back cover.
Figure 10:
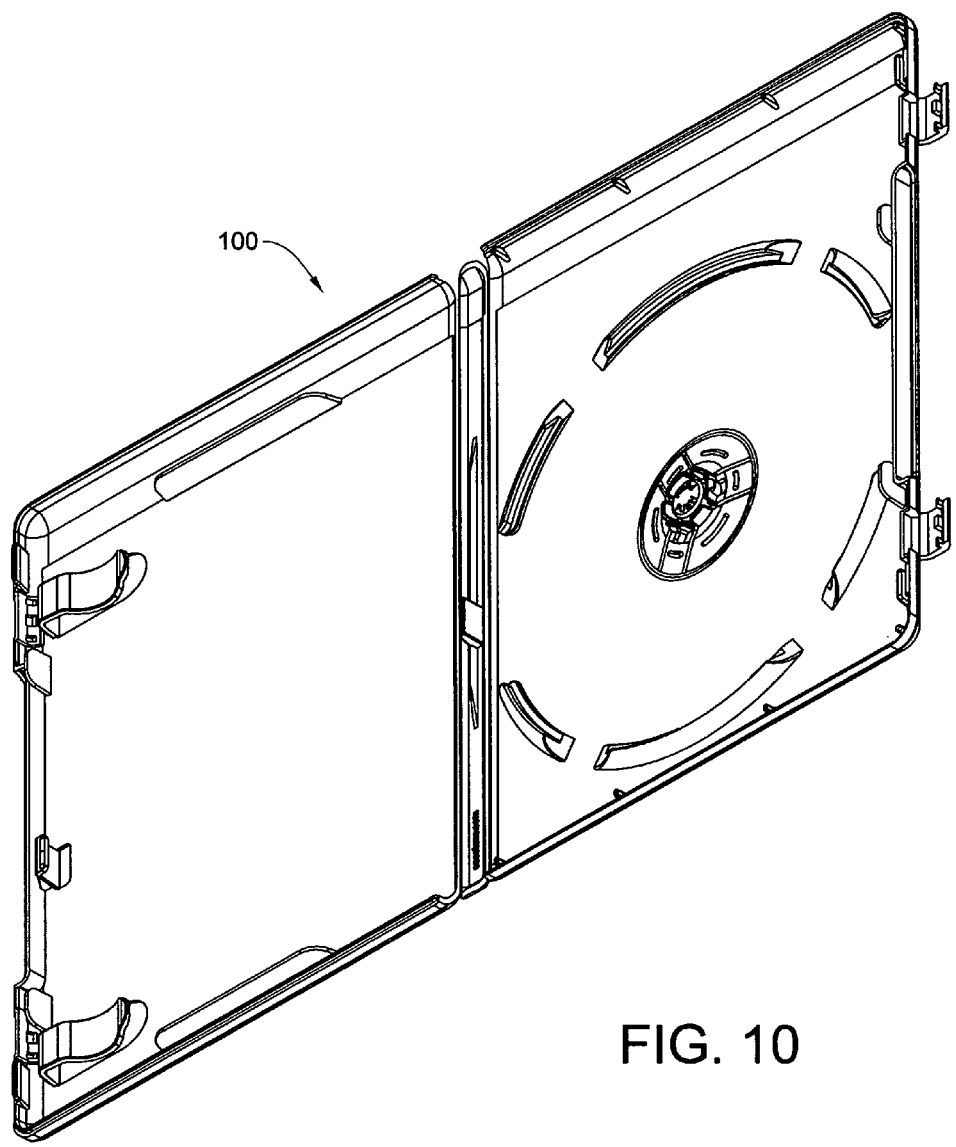
FIG. 10 is an isometric view of the new new injection-molded DVD case in full-open configuration, taken from a lower right vantage point and showing, primarily, the inner surfaces, the bottom edge, and the closure edge of the back cover.
Figure 11:
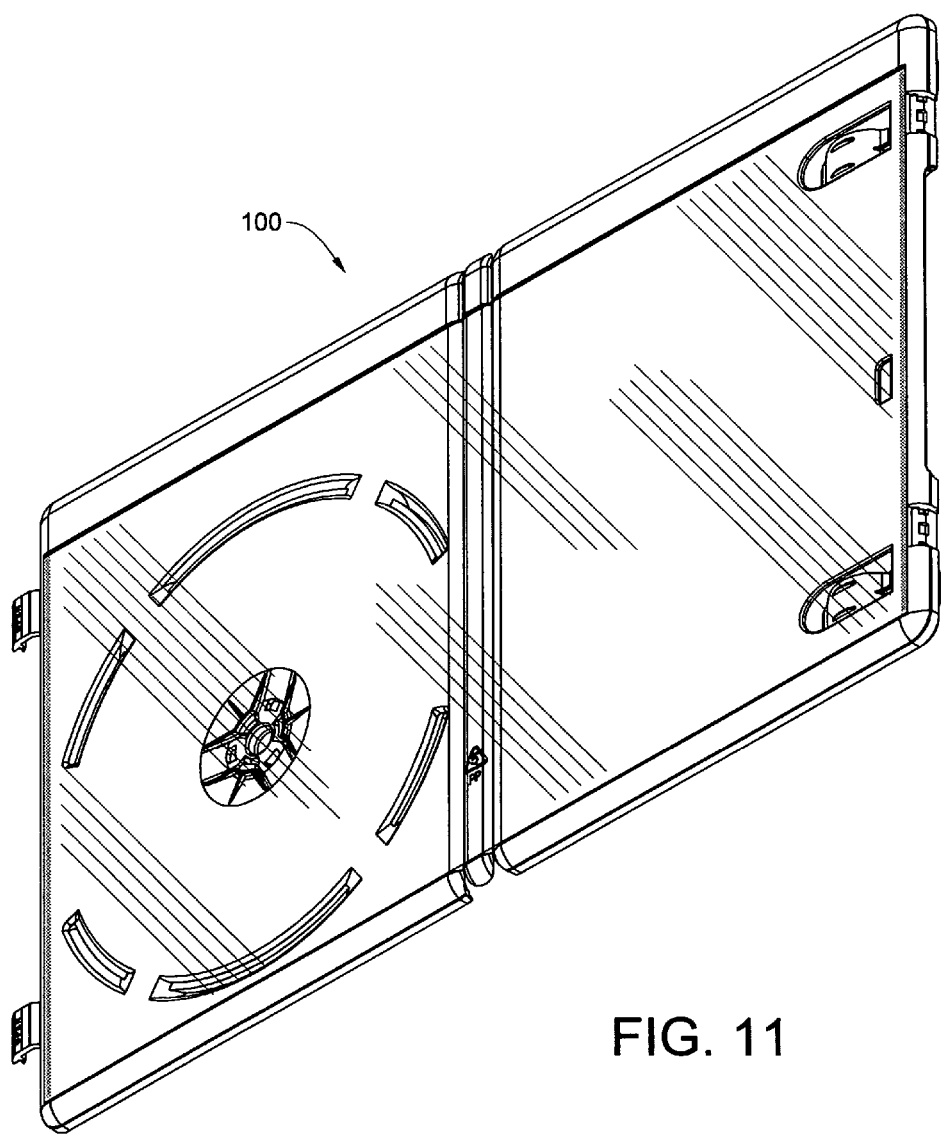
FIG. 11 is an isometric view of the new new injection-molded DVD case in full-open configuration, taken from a lower right vantage point and showing, primarily, the outer surfaces, the bottom edge, and the closure edge of the front cover.
Figure 13:
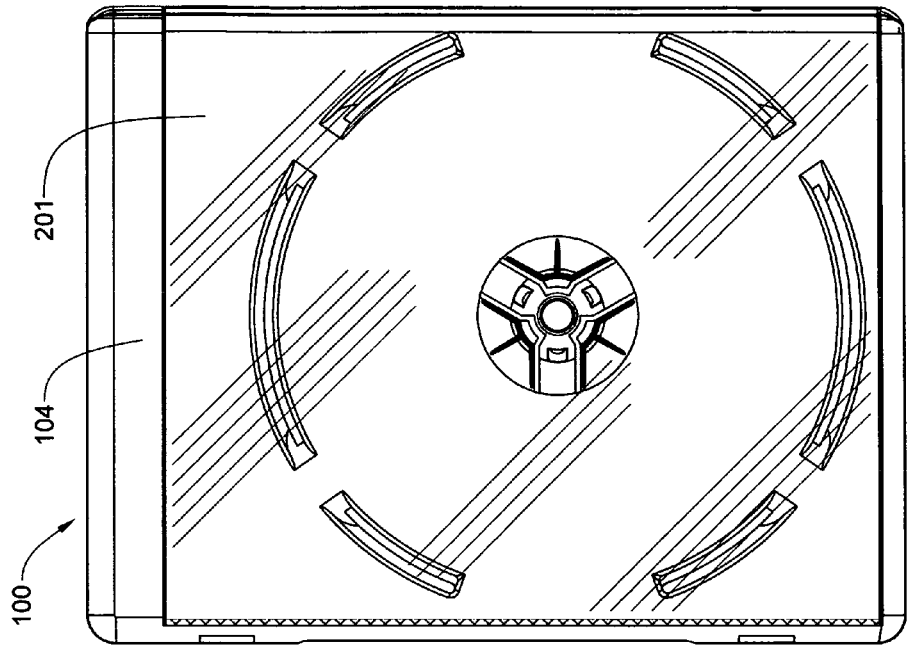
FIG. 13 is a plan view of the new injection-molded DVD case in a closed and latched configuration and showing, primarily, the outer surface of the back cover.
Figure 12:
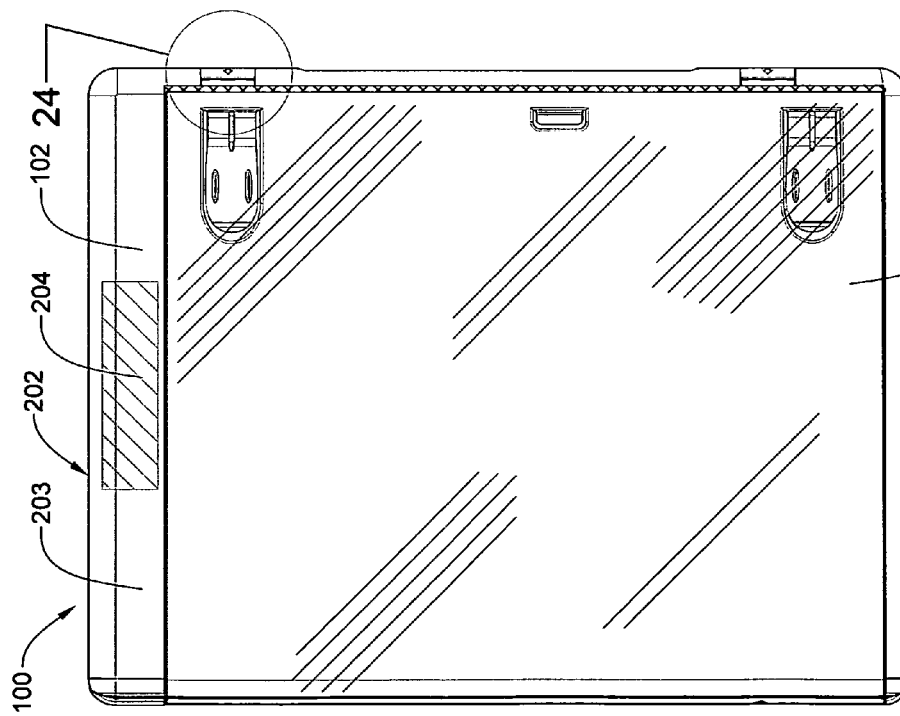
FIG. 12 is a plan view of the new injection-molded DVD case in a closed and latched configuration and showing, primarily, the outer surface of the front cover.
Figure 14:
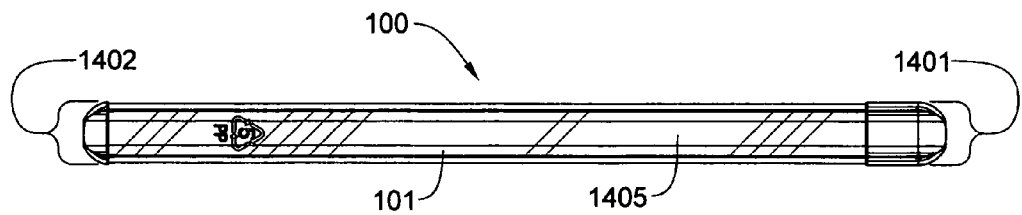
FIG. 14 is an elevational view of the spine rimwall of the new injection-molded CVD case in a closed and latched configuration.
Figure 15:
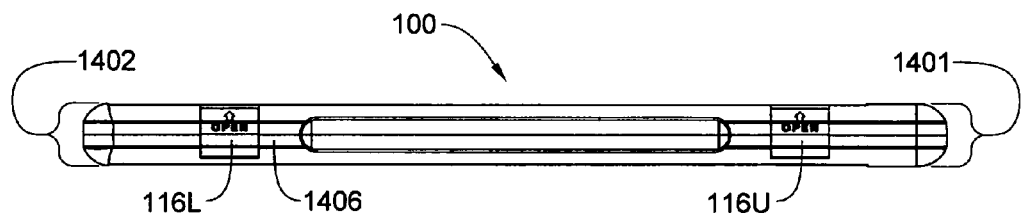
FIG. 15 is an elevational view of the closure rimwall of the new injection-molded CVD case in a closed and latched configuration.
Figure 16:
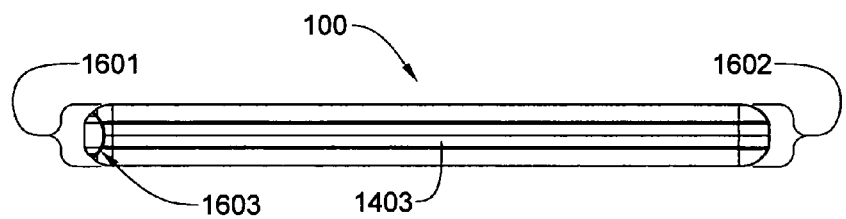
FIG. 16 is an elevational view of the top rimwall of the new injection-molded CVD case in a closed and latched configuration.
Figure 17:
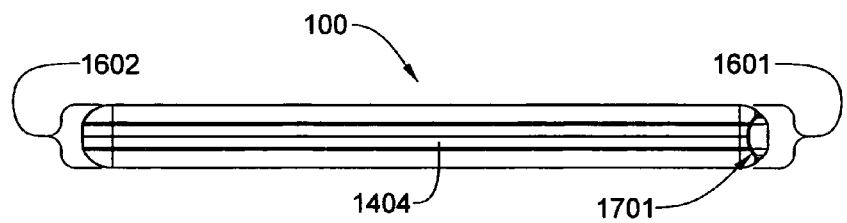
FIG. 17 is an elevational view of the bottom rimwall of the new injection-molded CVD case in a closed and latched configuration.
Figure 19:
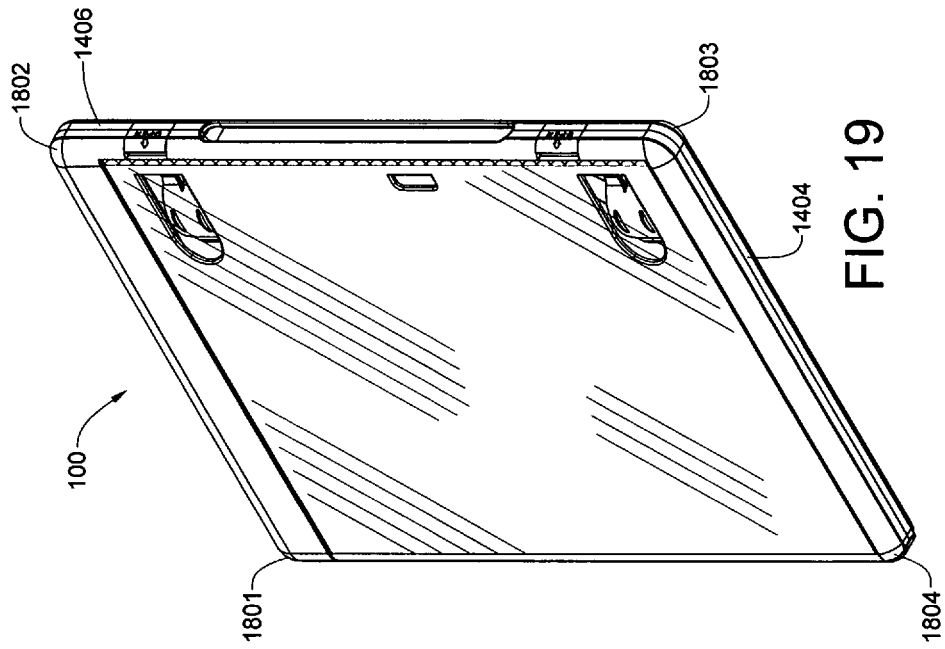
FIG. 19 is an isometric view of the injection molded DVD case in a fully closed and latched configuration, taken from a bottom right vantage point and showing primarily the front cover and the bottom and closure rimwalls.
Figure 18:
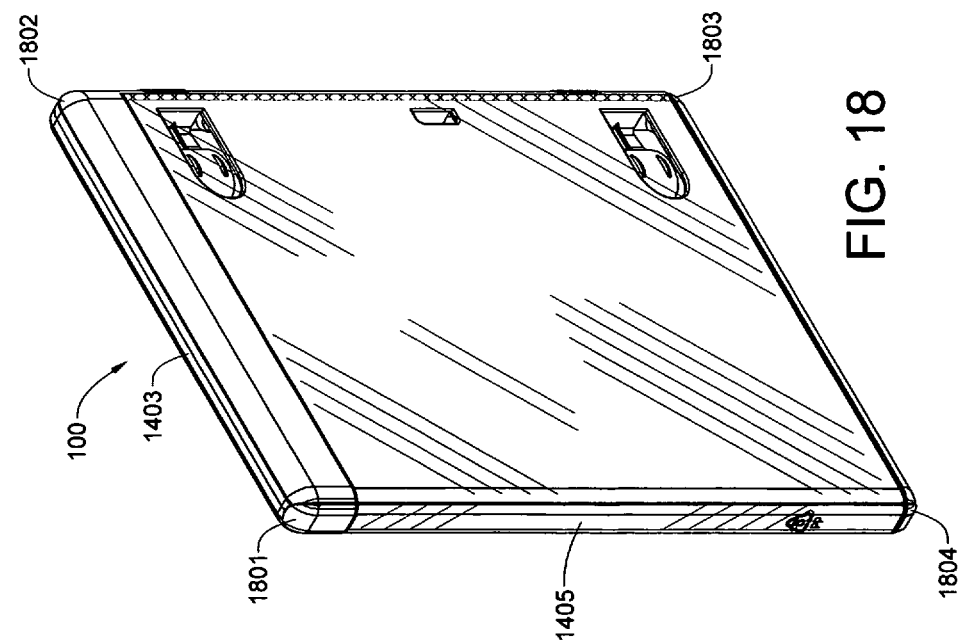
FIG. 18 is an isometric view of the injection molded DVD case in a fully closed and latched configuration, taken from an upper left vantage point and showing primarily the front cover and the top and spine rimwalls.
Figure 20:
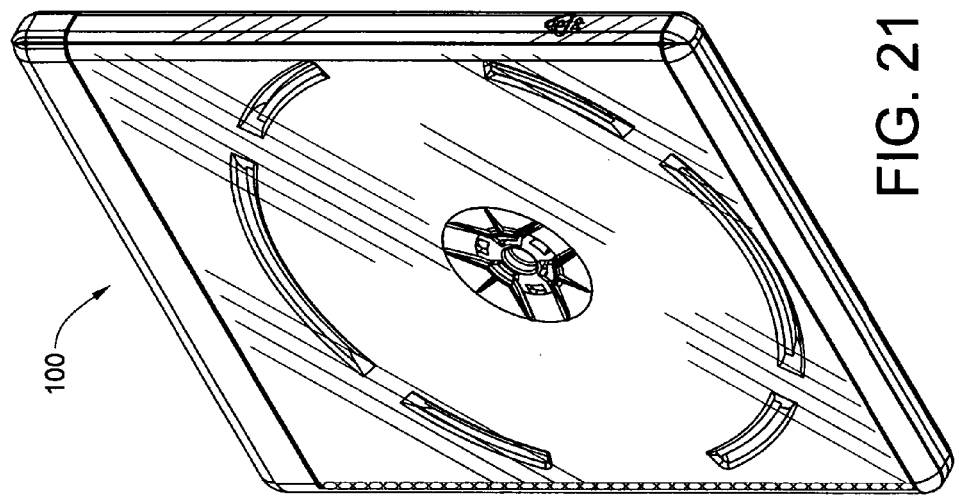
FIG. 20 is an isometric view of the injection molded DVD case in a fully closed and latched configuration, taken from an upper left vantage point and showing primarily the back cover and the top and closure rimwalls.
Figure 21:
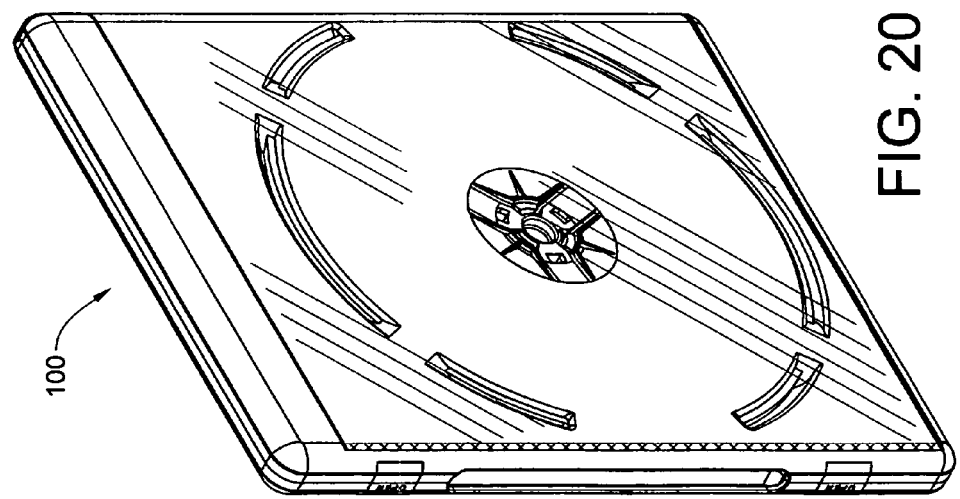
FIG. 21 is an isometric view of the injection molded DVD case in a fully closed and latched configuration, taken from a bottom right vantage point and showing primarily the back cover cover and the bottom and spine rimwalls.

Referring now to both FIGS. 1 through 13, the new DVD case 100 has an off-center disk mounting hub 106 and platform 107 (together, the hub and platform are referred to herein as the disk mounting structure 106/107) which are closer to the bottom of the case 100 than to the top thereof for two reasons. First, the laminar Mylar® sleeve 201 (of FIG. 2), which surrounds and covers major portions of the spine 101, the front cover 102, and the rear cover 104, and in which is inserted a printed paper title and credits page (not shown), has been set back from the upper edge 202 of the case 100 an amount sufficient to leave a transparent band 203 having a height within a range of about 1 to 2 centimeters on which the title "HD DVD", "Blue Ray Disc", or other logo (represented by rectangular area 204) can be printed so that it is visible and readable from a plan view of the front cover 102. The sleeve 201 is of generally rectangular shape and is heat bonded at opposite ends to the front cover 102 and rear cover 104 adjacent the respective closure edges For one commercial embodiment, the new case is fabricated from a colored transparent polyolefin material such as polypropylene or polyethylene. For most applications, polypropylene is considered the preferred material, as live hinges made of polypropylene can be flexed a much greater number of times than can be live hinges made of polyethylene. The second reason for the off-center disk mounting hub 106 and platform 107 is to provide space 108 inside the case, above the disk mounting platform 107, for an Electronic Article Surveillance (EAS) tag, without encroaching on the transparent title band 203 at the top of the case 100. In this case, the EAS tag will be mounted in the inside rectangular area 109. Another unique feature of the new case 100 is that the heights of the disk mounting hub 106 and platform 107 above the inner major surface of the rear cover 104 has been reduced so that it does not interfere with the automated equipment that attaches the EAS tag to the inside rectangular area 108. Not only is the new DVD 100 case unique and more aesthetically pleasing than current designs, it is also features enhanced structural rigidity and requires slightly less material for its manufacture.

Referring now to FIGS. 1 through 11, the new DVD case also incorporates significant anti-theft features. The spine 101 incorporates a tab 110 that rotates down over the outer edge of the stored DVD when the cover 102 is in a closed configuration. Likewise, the front cover has a bracket 111 of L-shaped cross section that locks over the opposite outer edge of the stored DVD when the front cover 102 is closed. Inner upper and lower guide walls 112U and 112L, respectively, on the inside front cover 102 not only serve to guide the placement of the booklet (not shown) that will be installed within the case beneath clips 113U and 113L so that it does not encroach on the transparent title band 203 at the top of the case 100, but also make it more difficult to shake a DVD, that has been released from the disk mounting hub 106, out of the top or bottom ends of the case that have been partially opened by bowing the front and back covers 102 and 104, respectively, of the case 100. The guide walls 112U and 112L make it necessary to bow the case considerably more than would be necessary for a case without such guide walls. In addition, guide walls 112U and 112L reinforce the front cover 102 so that it is more difficult to bow. As long as the front cover 102 and rear cover 104 are coupled together, guide walls 112U and 112L also make it more difficult to bow the rear cover. The case 100 also incorporates a first set of projections 114U and 114L, which extend vertically from the rear cover vertical near the closure edge, as well as a second set of projections 115U and 115L, which extend vertically from the front cover near the closure edge. These projections 114U, 114L, 115U and 115L make it difficult to slide a DVD out of the closure side of the case when it is opened just a crack. As an additional security feature, the case can be equipped with at least one, and preferably two security latches 116U and 116L that lock the front cover 102 and back cover 104 together along their closure edges 117 and 118, respectively, and can be taped over to slow down shoplifters, thereby making it more difficult to open the case, especially when wrapped in a heat-sealed sheet of transparent display wrap. The security latches 116U and 116L do not detract from the aesthetic quality of the case, as they conform to the shape of the case 100 when closed and locked.

Figure 22:
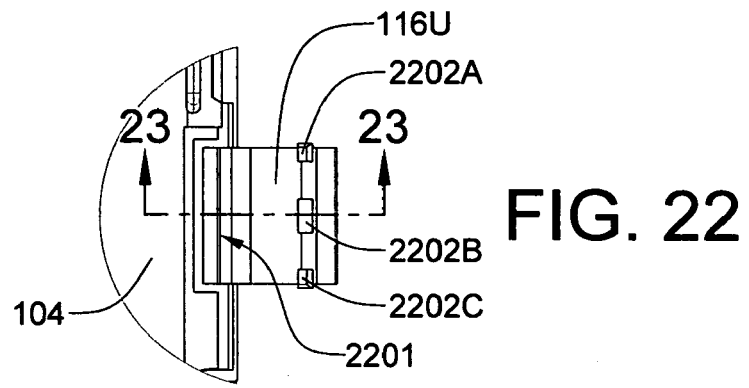
FIG. 22 is a close-up view of the open hinge within circle 22 of FIG. 1.

Referring now to FIG. 22, this close-up view of open upper security latch 116U shows how it is connected to the back cover 104 via a third live hinge 2201. The lower security latch 116L is identical to the upper latch 116U. It will be noted that each security latch 116U or 116L has three prongs 2202A, 2202B and 2202C.

Figure 23:
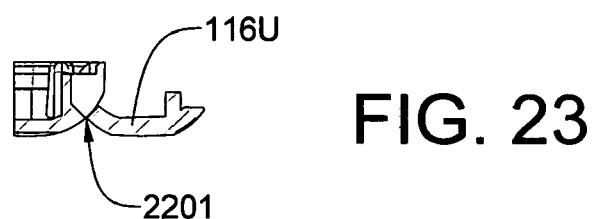
FIG. 23 is a cross-sectional view of the open hinge of FIG. 22, taken through section line 23-23 of FIG. 22.

Referring now to FIG. 23, this cross-sectional view shows the third live hinge 2201 from a different perspective.

Figure 24:
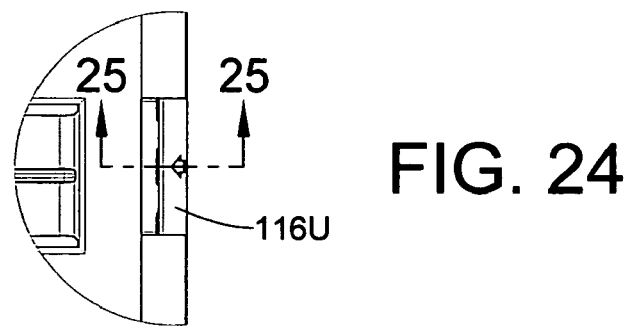
FIG. 24 is a close-up view of the closed hinge within circle 24 FIG. 12.
Figure 25:
FIG. 25 is a cross-sectional view of the closed hinge of FIG. 24, taken through section line 25-25 of FIG. 24.

Referring now to FIGS. 6, 24 and 25, it will also be noted that three apertures 601A, 601B and 601C are formed within an associated latch socket 602U or 602L in the front cover 102, and that the three prongs 2202A, 2202B and 2202C on each asociated latch 116U or 116L mate respectively mate with the three apertures 601A, 601B and 601C when the latches are closed.

Referring now to FIGS. 14 through 21, when in a closed configuration, the new DVD 100 has generally semi-cylindrical rimwalls, including an upper rimwall 1401, a lower rimwall 1402, a spine rimwall 1601, and a closure rimwall 1602, which intersect in generally quarter-spherical corners 1801, 1802, 1803 and 1804. In order to prevent multiple closed cases that are being pushed down an assembly line from climbing over one another, the generally semi-cylindrical rimwalls 1401, 1402, 1601 and 1602 have been flattened slightly, resulting in a flattened bands 1403, 1404, 1603 and 1604 running along a center portion of rimwalls 1401, 1402, 1601 and 1602, respectively. So that the front cover 102, the back cover 104 and the spine 101 may lie in a common plane when in an open configuration, it was found necessary to position the first live hinge 103 at a first quarter position along the spine rimwall 1601, and the second live hinge 105 at a third quarter position along the spine rimwall 1601. In other words, the front cover 102 incorporates about one-fourth of the spine rimwall 1601, the spine 101 incorporates about one-half of the spine rimwall 1601, and the back 104 cover incorporates the remaining about one-fourth of the spine rimwall 1601. This configuration has an added advantage in that, when the case is open, it occupies slightly less table space than does a DVD case having the same thickness and a flat spine that is perpendicular to the front and back covers when the case is closed.

Referring now to FIG. 8 to 12, it will be noted that the spine 101 has curved upper and lower end portions 801U and 801L, respectively, which fit into corresponding upper and lower cutouts 1603 and 1701 in the upper and lower rimwalls 1401 and 1402, respectively, when the case is in a closed configuration, a first half of each of said cutouts 1603 and 1701 being incorporated in the front cover and a second half of each of said cutouts being incorporated in the back cover.

Although only a single embodiment of the invention has been disclosed herein, it will be obvious to those of ordinary skill in the art that changes and modifications may be made thereto without departing from the scope and spirit of the invention as hereinafter claimed.

What is claimed is:

1. A one-piece, injection-molded case for storing an optical storage disc, said case comprising:
    a spine;
    a front cover coupled to said spine via a first living hinge; and
    a back cover coupled to said spine via a second living hinge:
    wherein said case, when in a closed configuration, has generally semi-cylindrical rimwalls, including upper and lower rimwalls, a spine rimwall, and a closure rimwall, which intersect in generally quarter-spherical corners; and
    a disk mounting structure, including a hub and a platform, positioned on an inner surface of the back cover, said disk mounting structure being positioned closer to said lower rimwall than to said upper rimwall; and
    a flexible, polymeric sleeve that wraps around the spine rimwall and is bonded to an edge of the closure rimwall on an outer surface of said front cover and to an edge of the closure rimwall on an outer surface of said back cover, said flexible polymeric sleeve being vertically displaced from the top rimwall to provide a band having a generally planar surface on an upper portion of the case with a height within a range of about 1 to 2 centimeters;
    wherein positioning of the disk mounting structure closer to said lower rimwall than to said upper rimwall provides a space on an inner surface of the back cover, above the disk mounting structure and below the band on the upper portion of the case, for the mounting of an EAS tag.

2. The case of claim 1, wherein each of the rimwalls has a flattened band running along a center portion thereof.

3. The case of claim 1, wherein said spine rimwall is hemi-cylindrical, the first living hinge is positioned at about a first quarter of the spine rimwall, and the second living hinge is positioned at about a third quarter of the spine rimwall, such that the front cover incorporates about one-fourth of the spine rimwall, the back cover incorporates about one-fourth of the spine rimwall, and the spine incorporates about one-half of the spine rimwall, having an outer contour that is generally about quarter cylindrical.

4. The case of claim 1, further comprising:
    a tab integral with the spine that rotates down over an outer edge of an optical storage disc stored on the disk mounting structure when the cover is in a closed configuration; and
    a bracket integral with the front cover that locks over the outer edge of a stored optical storage disc at a point adjacent to the closure rimwall when the front cover is closed, the tab and bracket cooperating to prevent a stored disc from being removed from the hub when the case is in a closed configuration.

5. The case of claim 1, further comprising upper and lower booklet clips and upper and lower guide walls integral with the inside front cover, the guide walls projecting upwardly from a major inner surface of the front cover, the guide walls serving to guide the placement of an informational booklet that will be installed within the case beneath the booklet clips so that the booklet does not encroach on the band on the upper portion of the case, the guide walls also serving to reinforce the front cover to make it more difficult to bow both the front and back covers when the case is in a closed configuration.

6. The case of claim 1, further comprising:
    a first set of projections, which extend vertically from an inner surface of said rear cover adjacent the closure edge; and
    a second set of projections, which extend vertically from the front cover near the closure edge, the first and second set of projections hampering removal of a stored optical storage disc through a alit along a closure rimwall when the case is in a partially-open configuration.

7. The case or claim 1 , further comprising at least one security latch that locks the front cover to the back cover along their closure edges.

8. The case of claim 1, wherein the spine has curved upper and lower end portions which fit into corresponding cutouts in the upper and lower sidewalls, respectively, when the case is in a closed configuration, a first half of each of the cutouts being incorporated in the front cover and a second half of each of the cutouts being incorporated in the back cover.

* * * * *